United States Patent
Park et al.

(10) Patent No.: US 9,621,492 B2
(45) Date of Patent: Apr. 11, 2017

(54) SYSTEM AND METHOD FOR PROVIDING INFORMATION INTERACTIVELY BY INSTANT MESSAGING APPLICATION

(75) Inventors: Euivin Park, Seongnam-si (KR); Heechan Yang, Seongnam-si (KR); Hyuk Jung, Seongnam-si (KR); Dongri Jin, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 206 days.

(21) Appl. No.: 13/548,936

(22) Filed: Jul. 13, 2012

(65) Prior Publication Data
US 2013/0144961 A1 Jun. 6, 2013

(30) Foreign Application Priority Data
Dec. 1, 2011 (KR) ........................ 10-2011-0127669

(51) Int. Cl.
*H04L 12/58* (2006.01)
*H04L 29/08* (2006.01)
*H04L 29/06* (2006.01)

(52) U.S. Cl.
CPC ............ *H04L 51/046* (2013.01); *H04L 51/02* (2013.01); *H04L 67/325* (2013.01); *H04L 65/40* (2013.01); *H04L 67/30* (2013.01)

(58) Field of Classification Search
CPC .... G06F 17/30023; G06F 17/28; G06F 15/00; G06F 15/16; G06F 15/173;
(Continued)

(56) References Cited

U.S. PATENT DOCUMENTS 5,943,055 A * 8/1999 Sylvan ................. G06F 3/0481
  379/201.04
6,044,275 A * 3/2000 Boltz et al. ................... 455/466
(Continued)

FOREIGN PATENT DOCUMENTS

JP 2003-132003 5/2003
JP 2005-107893 4/2005
(Continued)

OTHER PUBLICATIONS

What is Thread Messaging?, Chris V., answers.yahoo.com, Nov. 9, 2008.*
(Continued)

*Primary Examiner* — Brian J Gillis
*Assistant Examiner* — Boris Grijalva Lobos
(74) *Attorney, Agent, or Firm* — IPUSA, PLLC

(57) ABSTRACT

An information providing method and system may provide information while conversing with a user through an instant messaging application. The information providing system enables a user terminal to add, as a friend, a software bot which may be a virtual friend configured in an artificial software program through the instant messaging application executed in a user terminal. When the user inputs and transmits a message to the software bot through a conversation session, the information providing system may retrieve an appropriate response corresponding to the message from a database by inputting the message as a query, and may transmit the response to the user terminal, thereby providing the response to the user through the conversation session.

25 Claims, 19 Drawing Sheets

(58) Field of Classification Search
CPC . G06F 13/00; G06F 3/00; G06F 11/00; G06F 11/30; G06F 11/3058; G06F 11/3089; G06F 11/321; G06F 11/327; G06F 15/163; G06F 17/20; G06F 17/21; G06F 17/27; G06F 17/30; G06F 17/30002; G06F 17/30017; G06F 17/3005; G06F 17/30861; G06F 17/30997; H04W 4/00; H04W 7/00; H04L 51/00; H04L 51/02; H04L 51/04; H04L 51/046; H04L 51/10; H04L 51/16; H04L 51/18; H04L 51/20; H04L 65/00; H04L 65/40; H04L 65/403; H04L 67/00; H04L 67/16; H04L 67/20; H04L 67/22; H04L 67/30; H04L 67/325
USPC ............. 709/201–207; 704/2; 715/758
See application file for complete search history.

(56) References Cited

U.S. PATENT DOCUMENTS

| | | | |
|---|---|---|---|
| 6,430,602 B1* | 8/2002 | Kay et al. | 709/206 |
| 6,560,456 B1* | 5/2003 | Lohtia et al. | 455/445 |
| 6,678,215 B1* | 1/2004 | Treyz | G04G 13/028 368/10 |
| 6,898,569 B1 | 5/2005 | Bansal | G06Q 10/063116 340/994 |
| 7,058,510 B2* | 6/2006 | Kelly et al. | 702/2 |
| 7,080,018 B1* | 7/2006 | Fox | G06Q 30/02 705/14.5 |
| 7,287,057 B2* | 10/2007 | Lagarde et al. | 709/206 |
| 7,454,469 B2* | 11/2008 | Zhou et al. | 709/206 |
| 7,546,131 B1* | 6/2009 | Sidi et al. | 455/466 |
| 7,603,413 B1* | 10/2009 | Herold et al. | 709/204 |
| 7,669,134 B1* | 2/2010 | Christie et al. | 715/758 |
| 7,801,946 B2* | 9/2010 | Bearman | 709/203 |
| 8,000,888 B2* | 8/2011 | Kim | G08G 1/096716 340/995.13 |
| 8,032,397 B2* | 10/2011 | Lawless | 705/3 |
| 8,037,047 B2* | 10/2011 | Szeto et al. | 707/706 |
| 8,190,359 B2* | 5/2012 | Bourne | 701/410 |
| 8,280,993 B2* | 10/2012 | Awadallah et al. | 709/223 |
| 8,468,203 B2* | 6/2013 | Hind et al. | 709/205 |
| 8,477,693 B1* | 7/2013 | Knoop et al. | 370/328 |
| 8,645,841 B2* | 2/2014 | Ghosh | 715/747 |
| 2003/0083028 A1* | 5/2003 | Williamson | H04H 60/65 455/186.1 |
| 2004/0019645 A1* | 1/2004 | Goodman et al. | 709/206 |
| 2004/0078424 A1* | 4/2004 | Yairi et al. | 709/203 |
| 2005/0055412 A1* | 3/2005 | Kaminsky et al. | 709/207 |
| 2005/0055416 A1* | 3/2005 | Heikes et al. | 709/207 |
| 2005/0070251 A1* | 3/2005 | Satake | H04L 12/1859 455/411 |
| 2007/0156910 A1* | 7/2007 | Christie et al. | 709/227 |
| 2007/0168480 A1 | 7/2007 | Biggs et al. | |
| 2007/0230281 A1* | 10/2007 | You | G04G 13/021 368/10 |
| 2007/0288650 A1* | 12/2007 | Marshall | G01W 1/00 709/231 |
| 2008/0055263 A1* | 3/2008 | Lemay et al. | 345/173 |
| 2008/0113656 A1* | 5/2008 | Lee | H04L 67/325 455/414.3 |
| 2008/0256217 A1* | 10/2008 | Park | G06F 15/16 709/218 |
| 2009/0131089 A1* | 5/2009 | Micali et al. | 455/466 |
| 2009/0316671 A1* | 12/2009 | Rolf | H04W 4/02 370/338 |
| 2010/0130184 A1* | 5/2010 | Fan | H04L 67/18 455/414.3 |
| 2010/0191812 A1* | 7/2010 | O'Donovan | 709/206 |
| 2011/0018808 A1* | 1/2011 | Um | G06Q 10/10 345/168 |
| 2011/0087972 A1* | 4/2011 | Swink et al. | 715/752 |
| 2011/0106895 A1* | 5/2011 | Ventilla et al. | 709/206 |
| 2011/0151898 A1* | 6/2011 | Chandra et al. | 455/466 |
| 2011/0269508 A1* | 11/2011 | Libault | H04N 19/85 455/566 |
| 2012/0257878 A1* | 10/2012 | Fujimura | 386/291 |
| 2012/0260263 A1* | 10/2012 | Edoja | 719/313 |
| 2013/0166275 A1* | 6/2013 | Yang et al. | 704/2 |

FOREIGN PATENT DOCUMENTS

| | | |
|---|---|---|
| JP | 2005-332285 | 12/2005 |
| JP | 2007-516511 | 6/2007 |
| JP | 2007-534083 | 11/2007 |
| KR | 10-2002-0084003 | 11/2002 |
| KR | 10-2004-0092256 | 11/2004 |
| KR | 10-2005-0092936 | 9/2005 |
| KR | 10-2007-0011521 | 1/2007 |

OTHER PUBLICATIONS

NHN Corp., "'Line', a large Christmas event in progress," Homepage, Dec. 9, 2011, NHN Corp., Bundang, Korea.
NHN Corp., "'Line', a Christmas event in progress," Blog, Dec. 9, 2011, NHN Corp., Bundang, Korea.
NHN Corp., "Naver, targeting the global market for mobile IM 'line' integrated Upgrade," Homepage, Dec. 15, 2011, NHN Corp., Bundang, Korea.
NHN Japan Corp., "A "Line weather" appearance to be able to teach weather!," Blog, Aug. 19, 2011, NHN Japan Corp., Tokyo, Japan.
NHN Corp., "Naver japan Global Services 'Line'," Blog, Aug. 30, 2011, NHN Corp., Bundang, Korea.
NHN Corp., "Naver japan Mobile Messenger 'line', Hangul services Start," Homepage, Aug. 31, 2011, NHN Corp., Bundang, Korea.
NHN Corp., "Naver japan Mobile Messenger 'line', Hangul services Start," Blog, Aug. 31, 2011, NHN Corp., Bundang, Korea.
NHN Japan Corp., "An "interpreter" function comes up in mobile messenger application "Line"," Homepage, Oct. 3, 2011, NHN Japan Corp., Tokyo, Japan.
NHN Japan Corp., "An "interpreter" function comes up in mobile messenger application "Line"," Blog, Oct. 3, 2011, NHN Japan Corp., Tokyo, Japan.
NHN Corp., "Now, 'line' and enjoy voice conversations," Homepage, Oct. 5, 2011, NHN Corp., Bundang, Korea.
NHN Corp., "Naver japan Mobile Messenger 'line', from 108 countries around the world surpassed 7,000,000 downloads and soaring popularity," Homepage, Nov. 30, 2011, NHN Corp., Bundang, Korea.
Application Line weather forecast function, abandoned blogs [on line], Aug. 22, 2011 [Search date: Sep. 12, 2013], The Internet <URL: http://1982k.seesaa.net/article/221322578.html>.
You can send Email and a pictogram to anywhere in the world without phone charge with us! The "LINE", an application for smartphone, is too powerful and cool! Rocket news 24 [online], SOCIO Corporation, Nov. 25, 2011, [Search date: Sep. 12, 2013] The Internet <URL: http://rocletnews24.com/2011/11/25/156418/>, with English Concise Explanation.
Japanese Office Action dated Oct. 22, 2013.
Japanese Office Action dated Apr. 1, 2014.
Japanese Office Action mailed Mar. 1, 2016.

* cited by examiner

SYSTEM AND METHOD FOR PROVIDING INFORMATION INTERACTIVELY BY INSTANT MESSAGING APPLICATION

CROSS REFERENCE TO RELATED APPLICATION

This application claims priority from and the benefit of Korean Patent Application No. 10-2011-0127669, filed on Dec. 1, 2011, which is hereby incorporated by reference for all purposes as if fully set forth herein.

BACKGROUND OF THE INVENTION

Field of the Invention

Exemplary embodiments of the present invention relate to a system and method for providing information to a user through an instant messaging application connected over a network. Exemplary embodiments of the present invention also relate to a system and method for providing new user experience (UE) so that the user may receive information while is conversing with a virtual friend on a message transmission application.

Discussion of the Background

With distribution of information technology (IT) terminals including a touch sense display, for example, a smart phone, a tablet personal computer (PC), and the like, various applications may provide an instant messaging service in a mobile user terminal. In addition, as many users are becoming to be interested in the instant messaging service, the instant messaging service is quickly replacing an existing short message service (SMS) or a multimedia messaging service (MMS).

In an instant messaging service, a user may add a conversation friend using contact information of a user terminal, or may add a friend through a user selection. The user may open a conversation session with added friends to transmit and receive messages.

Even though the related art has proposed a service of providing an appropriate response by employing a user input message as a query in the SMS, the instant messaging application has not provided the above concept. There is no service that may provide information by adding, as a friend, a software bot that is a virtual artificial intelligent software program and thereby enabling a user to converse with a virtual friend.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide an information providing system and method that may provide information by providing a conversation typed is response to a user input message through an instant messaging application which may be executed in various types of communicable terminals, for example, a smart phone, a tablet personal computer (PC).

Exemplary embodiments of the present invention also provide an information providing system and method that may provide information required by a user in an interactive form through an instant messaging application using position information.

Exemplary embodiments of the present invention also provide information providing system and method that may selectively obtain a variety of information required by a user by providing various software bots.

Additional features of the invention will be set forth in the description which follows, and in part will be apparent from the description, or may be learned by practice of the invention.

Exemplary embodiments of the present invention disclose a method of providing information by using a processor through a messaging application. The method includes receiving, from a terminal, a request for adding a software bot as a friend. The method further includes registering the software bot as the friend, transmitting, by the software bot terminal, an input request message to the terminal, receiving a reply message in response to the input request message, and storing the reply message as database information associated with the terminal. The method also includes retrieving a response to a query from the database by inputting the reply message as the query, and transmitting the response to the terminal.

Exemplary embodiments of the present invention also disclose a method of providing information through a messaging application. The method includes recommending a terminal for at least one software bot registered as a friend. The method further includes receiving, from the terminal, a request for adding, as the friend of the terminal, a software bot, and registering the software bot as the friend of the terminal, initiating a conversation session with the software bot, transmitting, by the software bot, an input request message to the terminal within the conversation session. The method also includes receiving a reply message from the terminal within the conversation session in response to the input request message, storing the reply message as terminal information associated with the terminal, retrieving a response to a query from a database by inputting the reply message as the query, and transmitting the response to the terminal.

Exemplary embodiments of the present invention also disclose a system for providing information through a messaging application. The system includes an access manager configured to manage an access of a terminal over a network, and to receive a reply message that is transmitted from a terminal to a software bot in response to an input request message of the software bot. The system also includes an information storage unit configured to store and manage information associated with the software bot added by the terminal and information associated with a conversation session between the terminal and the software bot, and a processor configured to retrieve a response to a query from a database by inputting the reply message as the query. The access manager may be configured to control the software bot to transmit the input request message to the terminal, which may receive the reply message through the conversation session, and may transmit the response to the terminal. The reply message may be stored in the information storage unit.

Exemplary embodiments of the present invention also disclose a non-transitory computer-readable recording medium having recorded thereon a program that causes a computer to execute a method of providing information through a messaging application. The method includes receiving, from a terminal, a request for adding a software bot as a friend. The method further includes registering the software bot as the friend of the terminal, transmitting, by the software bot terminal, an input request message to the terminal, receiving a reply message from the terminal in response to the input request message, and storing the reply message as information database. The method also includes retrieving a response to a query from the database by inputting the reply message as the query, and transmitting the response to the terminal.

Exemplary embodiments of the present invention also disclose a non-transitory computer-readable medium comprising an executable program, which when executed, perform a method of providing information through a messaging application. The method includes recommending a terminal for at least one software bot for registering as a friend. The method further includes receiving, from the terminal, a request for adding, as the friend of the terminal, a software bot of the recommended at least one software bot, registering the software bot as the friend of the terminal, initiating a conversation session with the software bot, transmitting, by the software bot, an input request message to the terminal within the conversation session. The method also includes receiving a reply message input by the terminal within the conversation session in response to the input request message, storing the reply message as information database, retrieving a response to a query from the database by inputting the reply message as the query, and transmitting the response to the terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and as part of the description serve to explain the principles of the invention.

DETAILED DESCRIPTION OF THE ILLUSTRATED EMBODIMENTS

Figure 1:
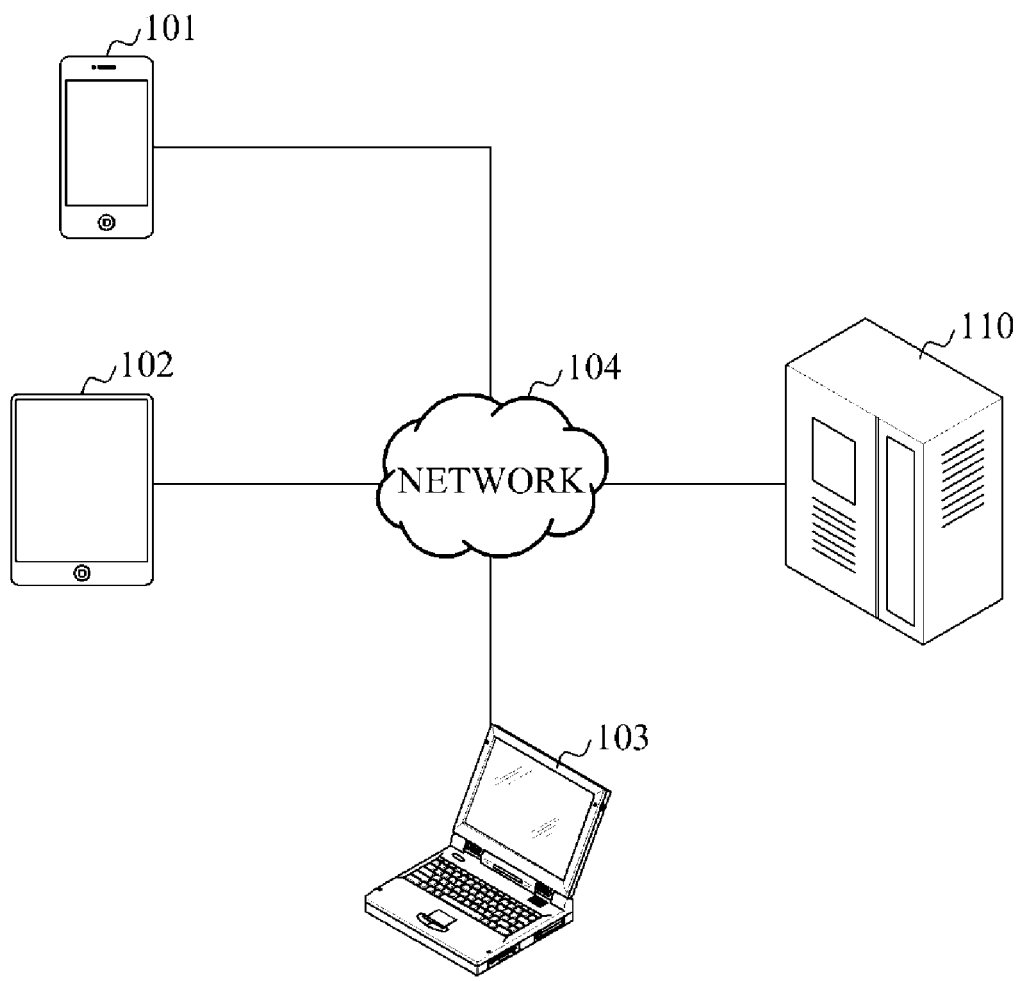
FIG. 1 is a diagram illustrating a connection configuration between an information providing system and user terminals according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's is relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or is overly formal sense unless expressly so defined herein.

Hereinafter, exemplary embodiments of the present invention will be explained in detail with reference to the accompanying drawings.

FIG. 1 is a diagram illustrating a connection configuration between an information providing system and user terminals according to exemplary embodiments of the present invention.

Referring to FIG. 1, in a diagram 100, an information providing system 110 may provide an instant messaging service over a network 104. The instant messaging service may be provided from the information providing system 110 through instant messaging applications installed in the user terminals 101, 102, and 103.

Figure 2:
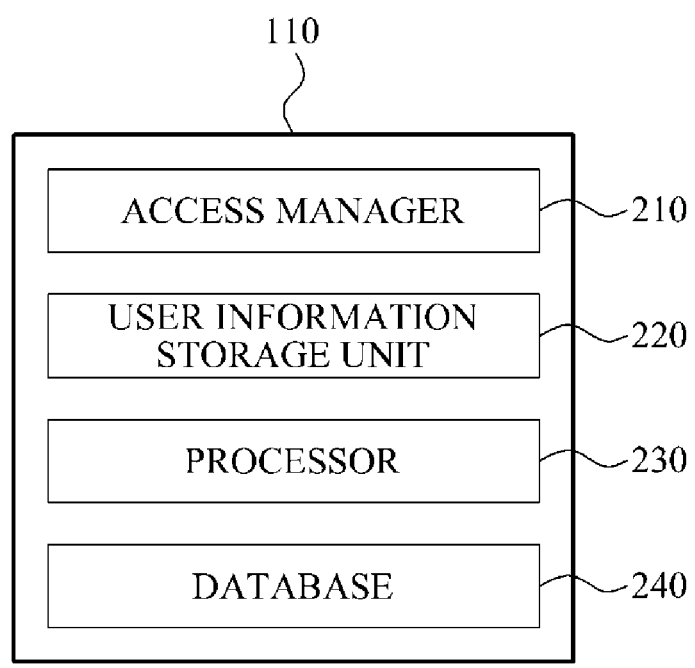
FIG. 2 is a block diagram illustrating an information providing system according to exemplary embodiments of the present invention.

FIG. 2 is a block diagram illustrating the information providing system according to exemplary embodiments of the present invention.

FIG. 2 describes information providing system 110 of FIG. 1 in detail. An access manager 210 may be understood as a communication module that may manage connection between the information providing system 110 and various user terminals 101, 102, and 103 over the network 104, as shown in FIG. 1.

Messages received from the user terminals 101, 102, and 103 may be transferred to a processor 230 via the access manager 210. When the processor 230 provides a message of a software bot to perform conversation between the software bot and a user, the message may be transferred to the user terminals 101, 102, and 103 via the access manager 210.

A user information storage unit 220 may refer to any type of physical logical configurations that may store and manage various user subscription information, information associated with a software bot added as a friend, information associated with a conversation is session with a user, and the like.

The processor 230 may receive a user message in a service of a conversation scheme between a user and a software bot, for example, a one-to-one chatting scheme, and may generate and provide an answer of the software bot in response to the message. In addition to a response to the user message, the answer may also include any types of message determinations, for example, a query, a notice, and the like, that the software bot transfers to the user. It will be further described later.

In FIG. 2, a database 240 may store information used by the processor 230 to perform the conversation between the software bot and the user. For example, in association with a software bot for guiding weather, weather information for each region/date may be stored. The database 240 may include any types of physical and logical data storage configurations that may provide at least one answer to a predetermined query.

Hereinafter, various operations or applications performed by the information providing system 110 will be described. Even though configurations of the access manager 210, the user information storage unit 220, the processor 230, and the database 240 are not particularly specified, content that may be clearly understood and be predicted by those skilled in the art may be understood as a general embodiment and the scope of the present invention is not limited to or restricted by a name of a predetermined configuration or physical/logical structure.

Figure 3:
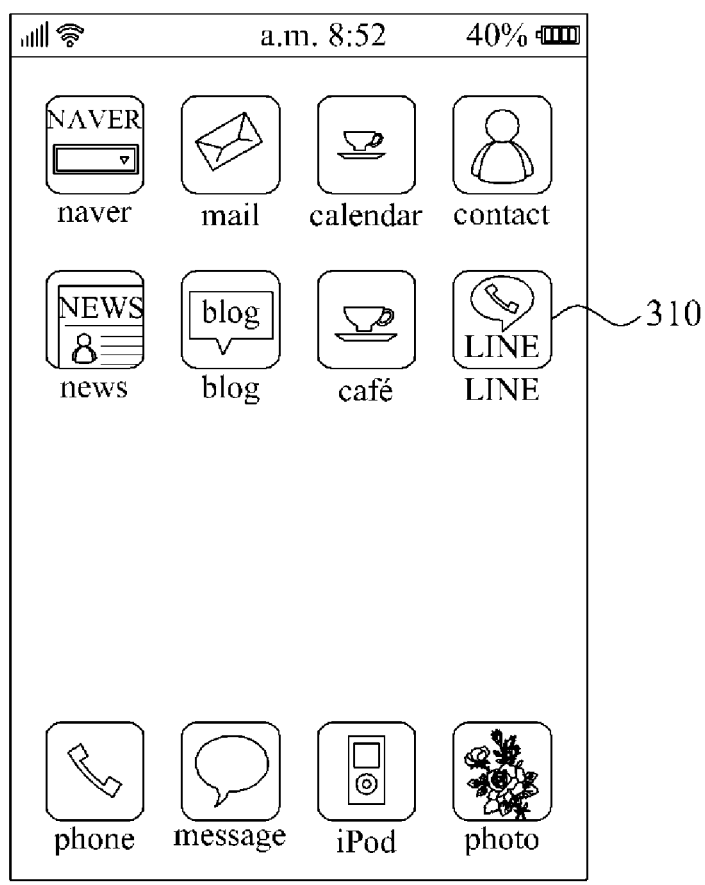
FIG. 3 is a user interface displaying icons of an instant messaging application associated with an information providing method, on a user terminal according to exemplary embodiments of the present invention.

FIG. 3 is a user interface displaying icons of an instant messaging application associated with an information providing method, on a user terminal according to exemplary embodiments of the present invention.

The instant messaging application 310 may be distributed in an application store or market as one of a plurality of applications to be installed in a user terminal.

When a user executes the instant messaging application 310, the user may open a conversation session with registered friends and may transmit and receive messages to and from the friends. A software bot that is a virtual artificial intelligent software program may be added as a friend.

Hereinafter, a process of adding a friend and providing information after executing the instant messaging application 310 will be described with reference to the accompanying drawings.

Figure 4:
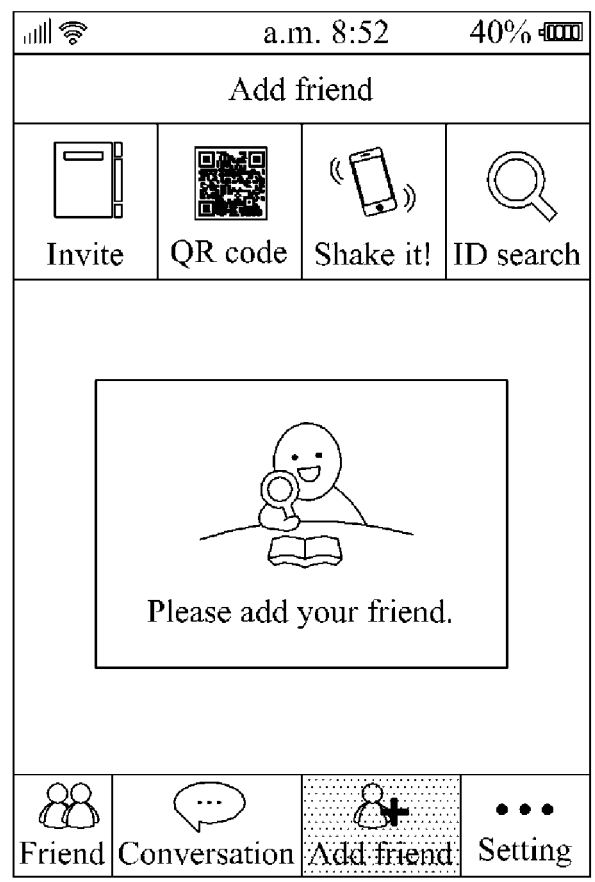
FIG. 4 is a user interface for providing a friend add function in an instant messaging application according to exemplary embodiments of the present invention.

FIG. 4 is a user interface to provide a friend add function in the instant messaging application according to exemplary embodiments of the present invention.

The instant messaging application 310 of FIG. 3 may automatically access a contact list of a user terminal to add, to a friend list, friends having installed the same application, and may also directly add a friend using the user interface of FIG. 4.

Content in which a friend may be manually added through an ID search may be applied to the conventional instant messaging application. According to exemplary embodiments of the present invention, it is possible to add a friend through near field communication and motion sensing using a quick response (QR) code (registered trademark).

In the instant messaging application 310, the user may selectively add, as a friend, various types of software bots provided from the information providing system 110.

The various software bots may be provided through a friend recommendation function of the information providing system 110, and may also be provided from a separately provided software bot store. Addition of software bots will be further described hereinafter with reference to FIG. 18.

Hereinafter, an exemplary embodiment of the present invention will be described by employing a predetermined software bot as an example.

Figure 5:
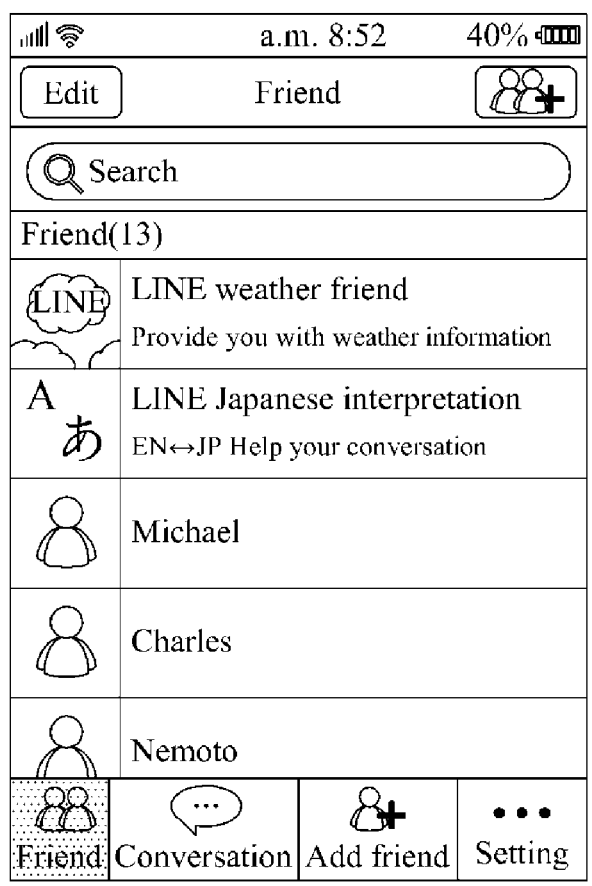
FIG. 5 is a user interface displaying software bots included in a registered friend list in an instant messaging application according to exemplary embodiments of the present invention.

FIG. 5 is a user interface displaying software bots registered in the friend list in an instant messaging application according to exemplary embodiments of the present invention.

Referring to FIG. 5, for example, "LINE weather friend", that is a software bot for providing weather information, and "LINE Japanese interpretation friend", that is a software bot for providing interpretation between English and Japanese, may be included in a friend list.

A user may add the above software bots as friends equivalent to actual users, or may delete the software bots from the friend list. A process of opening a conversation session with the software bots and thereby performing one-to-one chatting may be the same as chatting with friends that are actual users.

Accordingly, since the user may treat virtual users, for example, the software bots as if the virtual users are the actual friends, the user interface according to the exemplary embodiment of the present invention is different from an information search interface in conventional instant messaging services.

Hereinafter, a process of providing information according to exemplary embodiments of the present invention, for example, by opening a conversation session with a software bot "LINE weather friend" and transmitting and receiving messages in a one-to-one chatting form will be further described with reference to the accompanying drawings.

FIG. 6, FIG. 7, FIG. 8, FIG. 9, FIG. 10, FIG. 11, FIG. 12, FIG. 13, FIG. 14, FIG. 15 and FIG. 16 are user interfaces for providing a user with information in an interactive form through a conversation session with a software bot in an instant messaging application according to exemplary embodiments of the present invention.

Figure 6:
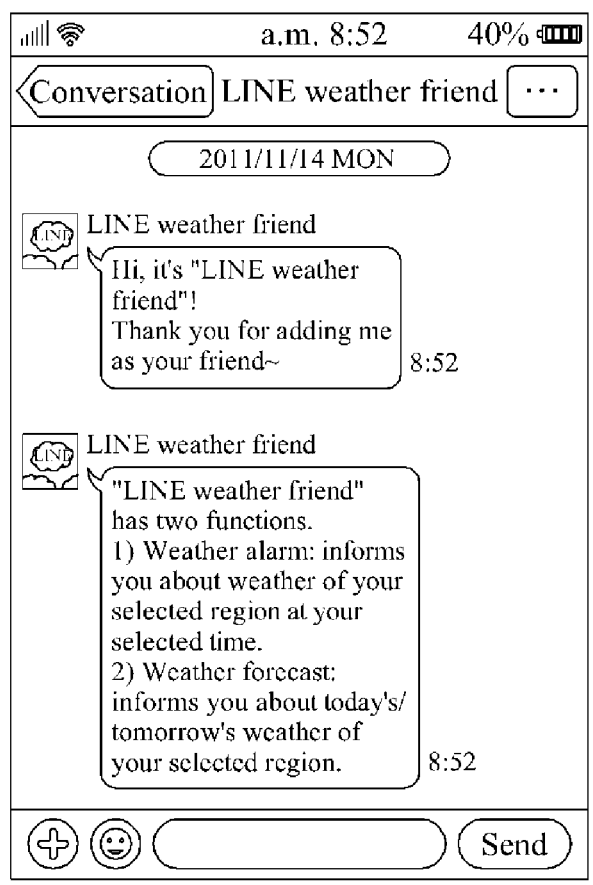
FIG. 6, FIG. 7, FIG. 8, FIG. 9, FIG. 10, FIG. 11, FIG. 12, FIG. 13, FIG. 14, FIG. 15, and FIG. 16 are user interfaces for providing a user with information in an interactive form through a conversation session with a software bot in an instant messaging application according to exemplary embodiments of the present invention.

FIG. 6 shows an example of initially performing one-to-one chatting with "LINE is weather friend" after adding the software bot "LINE weather friend" as a friend through a method of accepting a friend recommendation when the friend recommendation is received, a method of retrieving a software bot and adding the retrieved software bot as a friend, and the like.

The software bot "LINE weather friend" may transmit a message from the database 240 to a user according to a predetermined scheme.

A brief address and a simple guidance about how to use the software bot may be introduced. Other notices may also be provided in an interactive form of an instant messaging service.

Figure 7:
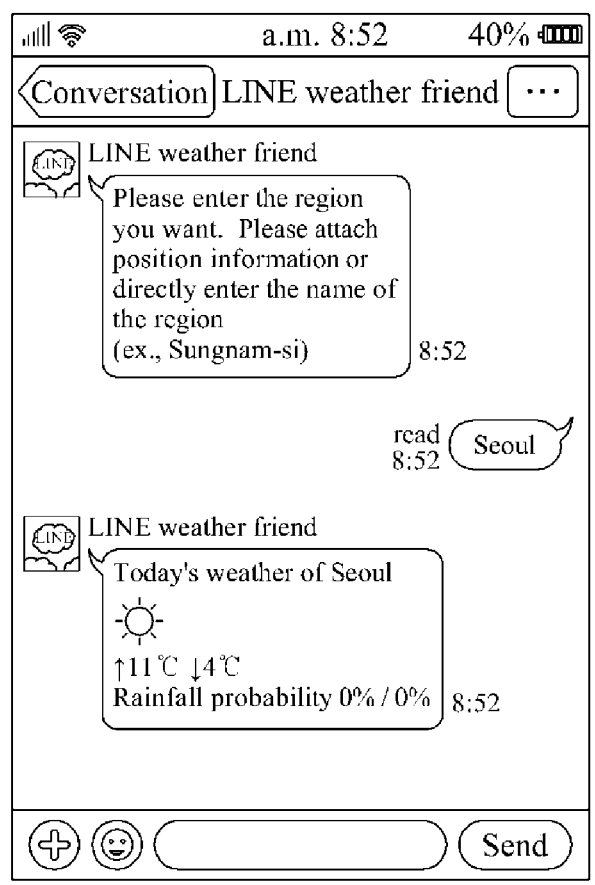

As shown in FIG. 7, to set a basic region about the corresponding user, the software bot "LINE weather friend" may transmit, to the user, an input request message requesting the user to input a region to be set as the basic region.

The user may input a region of interest (ROI), for example, "Seoul" in a message transmission form of one-to-one chatting. A reply message input by the user may be stored as information associated with the user in the user information storage unit 220 of FIG. 2.

The user may perform conversation as if the user one-to-one chats with a friend in the instant messaging application being executed in a user terminal. Content of a message to be transmitted to the user, including a response to be transmitted in response to the user input during the conversation, may be determined by the information providing system 110 connected through the instant messaging application and/or the network.

The software bot "LINE weather friend" may receive the response from the information providing system 110, and may provide today's weather of "Seoul" that is input as the basic region.

In addition to simply retrieving a response in response to a user query and providing the retrieved response, the above operation in the conversation session of the software bot "LINE weather friend" may aggressively guide a function and induce a user input in order to induce the usage of various functions that may be employed by the user.

Figure 8:
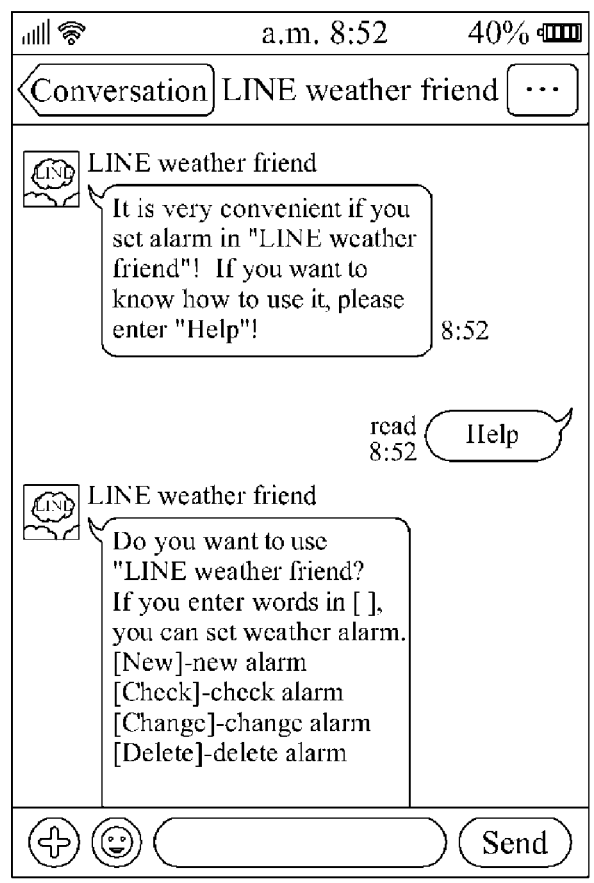

For example, as shown in FIG. 8, the software bot "LINE weather friend" may guide the user to about that the user may set a weather guide alarm service, and may also guide the user about a specific command when the user requests a help. The above content may be provided in a one-to-one chatting form in the instant messaging application.

Figure 9:
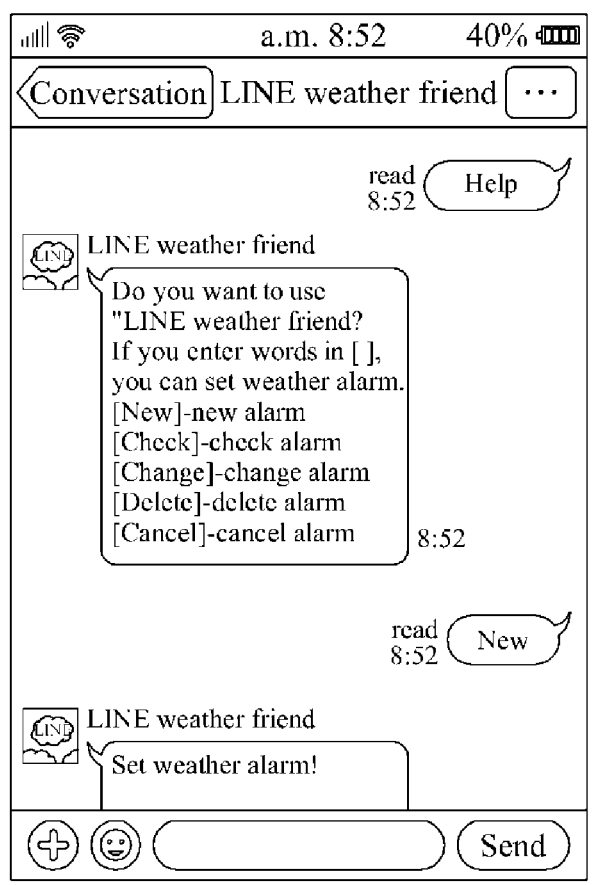

Referring to FIG. 9, when the user reads a function guide and inputs "new" to set a weather alarm, the software bot "LINE weather friend" may prepare alarm setting.

Figure 10:
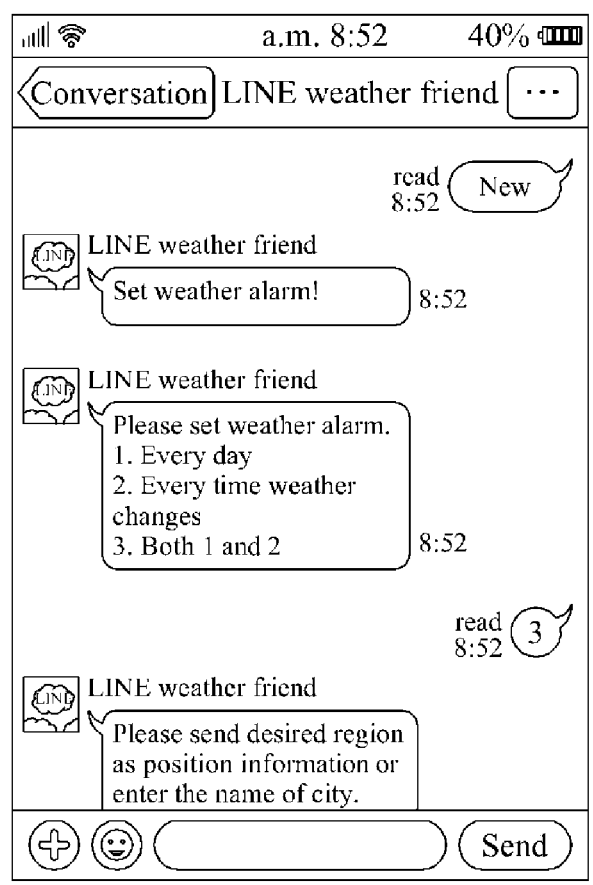
Figure 11:
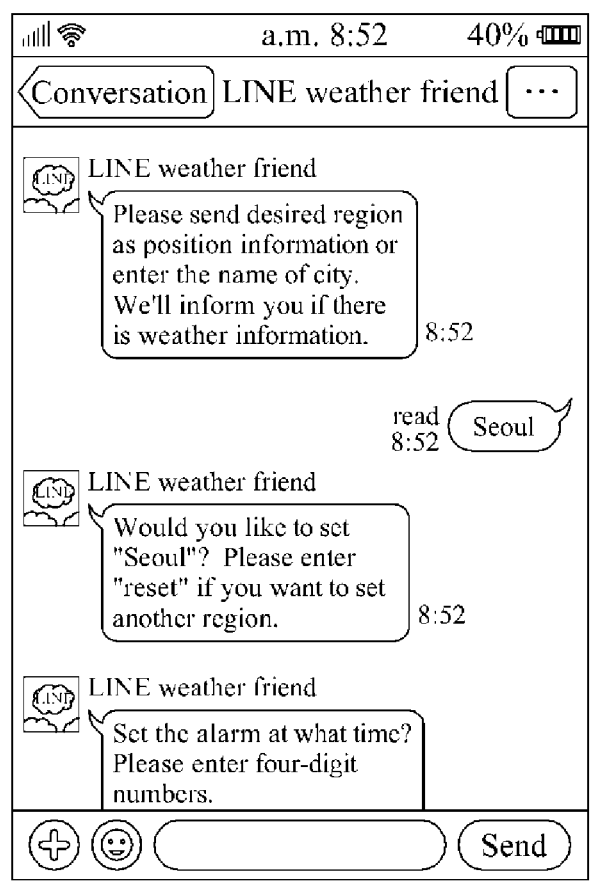
Figure 12:
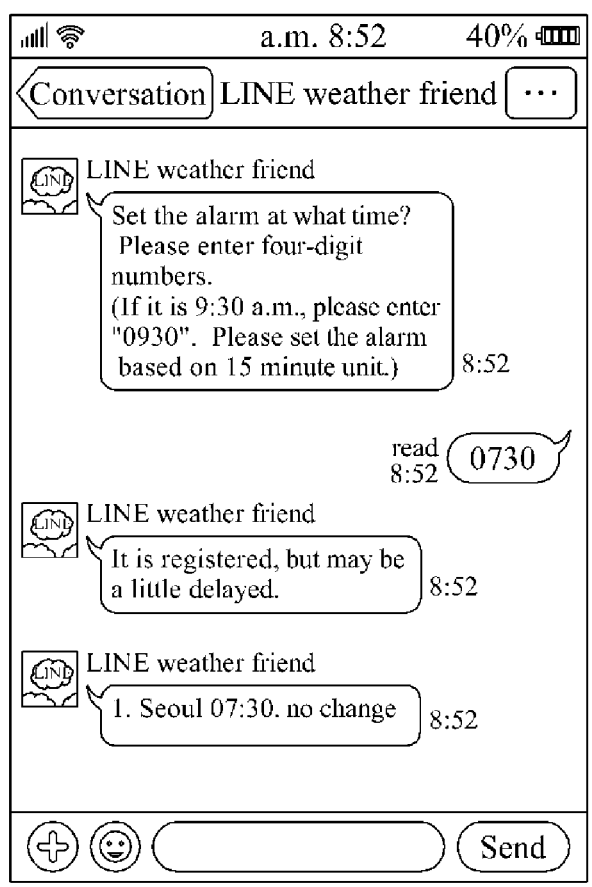

As shown in FIG. 10, the software bot "LINE weather friend" may guide the user through alarm options and may receive a user input. As shown in FIG. 11 and FIG. 12, the software bot "LINE weather friend" may receive a user input on the region and may receive a user input on an alarm time, respectively.

Based on the designated alarm option and region/time setting, the software bot "LINE weather friend" may receive weather information from the database 240 and provide the user with the weather information in an interactive form and/or a push alarm form in the user terminal. As described above, according to an exemplary embodiment of the present invention, it is possible to store a reply message of a user as user information, and to periodically transmit a response through a messaging application of the user terminal.

Figure 13:
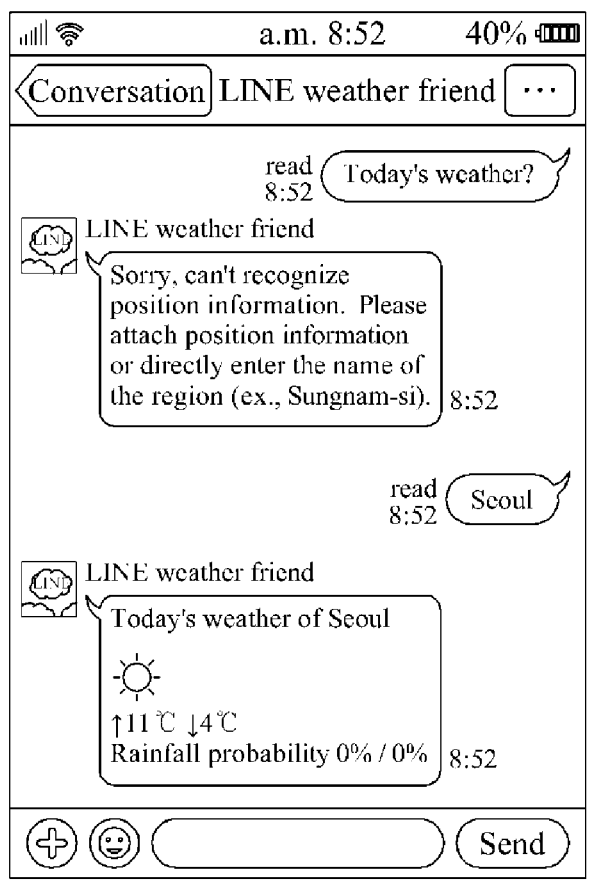

FIG. 13 shows a user interface in which a user requests weather information in a conversation session with a software bot "LINE weather friend" at an arbitrary time.

When the user requests information associated with today's weather, the software bot "LINE weather friend" may ask the user about a desired region, for example, a ROI. When the region is not input, the software bot "LINE weather friend" may inform the user about weather of a region that is set as a basic region. However, it is only an example and thus, may be differently set based on various embodiments.

For example, it is possible to inform the user about weather around a current user position using global positioning system (GPS) information of the user terminal, and to inform the user about weather of a point/region selected by the user on a map screen. In FIG. 13, the software bot "LINE weather friend" guides the user about today's weather when the user manually inputs "Seoul" as the ROI.

Figure 14:
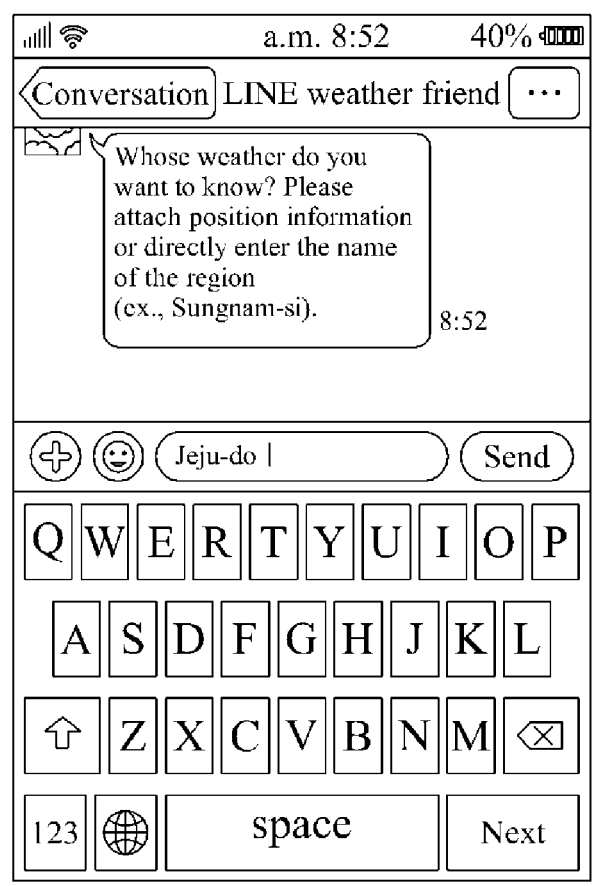

Meanwhile, when the software bot "LINE weather friend" cannot find, from the user input message, appropriate content used to provide weather information even by referring to data of the database 240, the software bot "LINE weather friend" may induce the user to perform an input associated with a service provided by the corresponding software bot as shown in FIG. 14.

Figure 15:
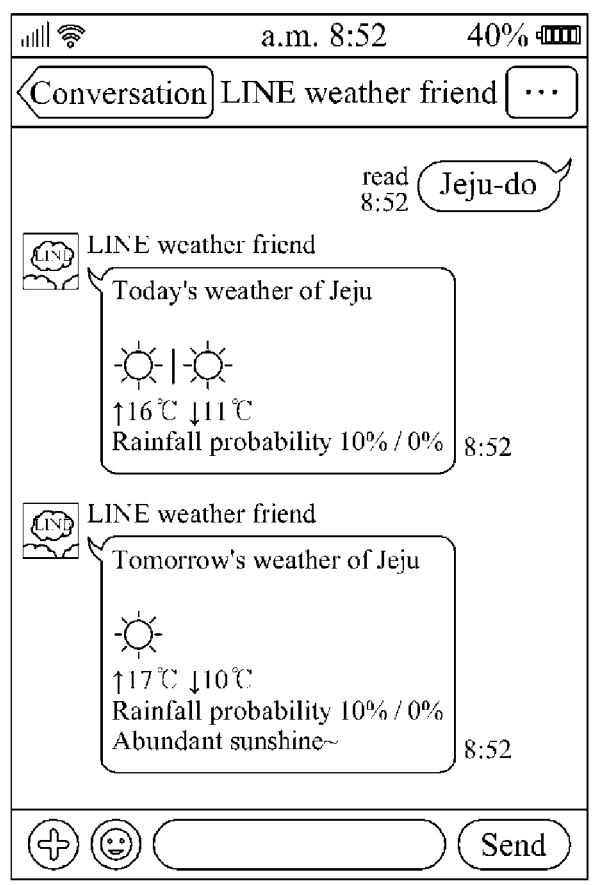

Accordingly, the user may perform a meaningful input, for example, input of a region/date, and the like, on an input window. FIG. 15 shows a user interface in which the software bot "LINE weather friend" provides today's weather and tomorrow's weather of Jeju island with respect to an input "Jeju-do".

When a region range input by the user does not match a providing range of the database 240, the software bot "LINE weather friend" may guide the user about a range most similar to the user input.

Figure 16:
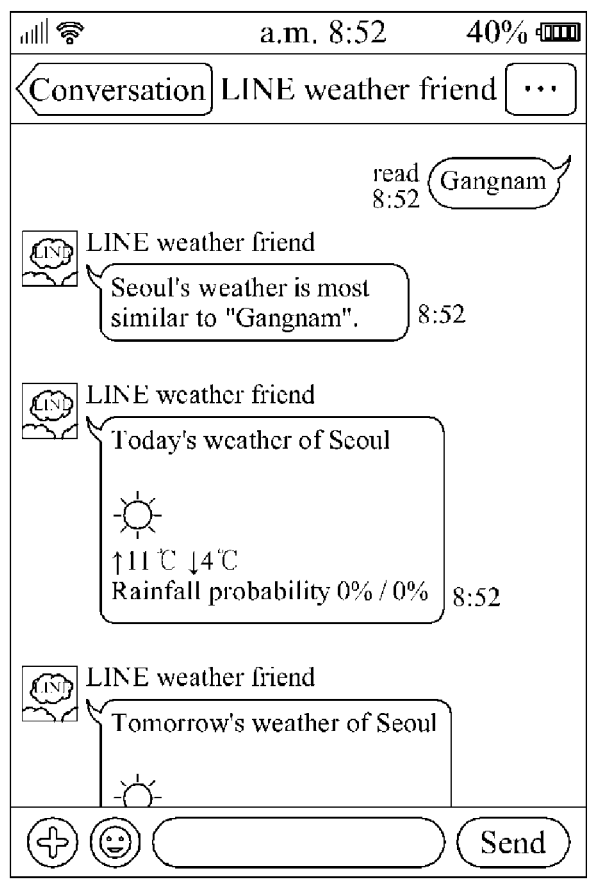

For example, as shown in FIG. 16, when the user inputs "Gangnam", the software bot "LINE weather friend" may guide the user about the weather of "Seoul" that is the most is similar region range including "Gangnam".

The user may terminate and then restart the above conversation session at any time.

Figure 17:
FIG. 17 is a user interface displaying a conversation session with a software bot generated in an instant messaging application according to exemplary embodiments of the is present invention.

FIG. 17 is a user interface displaying a conversation session with a software bot generated in an instant messaging application according to exemplary embodiments of the present invention.

When conversation sessions are provided as a list, the user may continue conversation with a predetermined software bot by selecting a single conversation session from the list.

As described above with reference to FIG. 4, various software bots may be provided in a friend recommendation or bot store/market page form.

Figure 18:
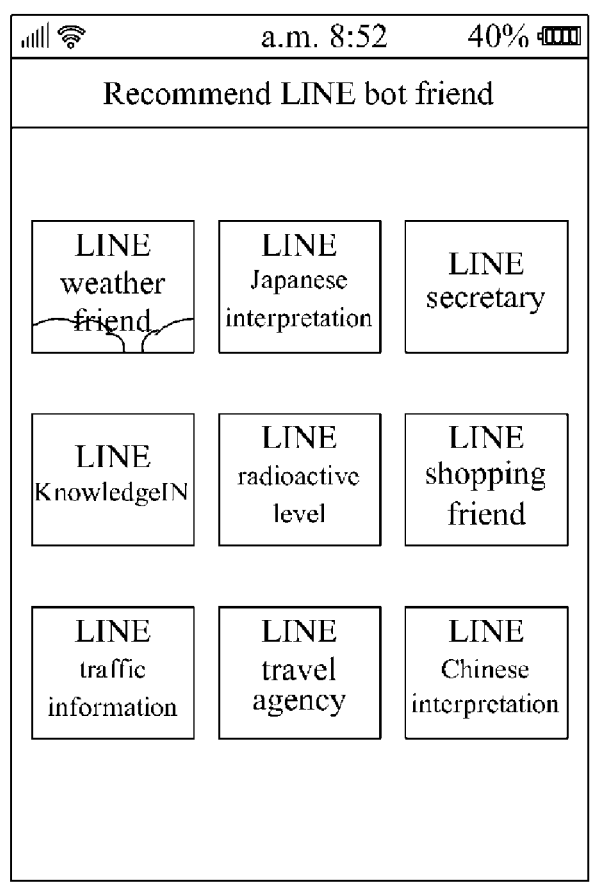
FIG. 18 is a user interface displaying software bots addable in an instant messaging application according to exemplary embodiments of the present invention.

FIG. 18 is a user interface displaying software bots that may be added in an instant messaging application according to exemplary embodiments of the present invention.

"LINE weather friend" and "LINE Japanese interpretation" are described above.

A software bot "LINE secretary" enables the user to store schedules, or to use a predetermined alarm function in an interactive form. A software bot "LINE KnowledgeIN" enables the user to retrieve general information in interaction with a KnowledgeIN service of a portal site and the like.

A software bot "LINE radiation level" may provide in real time information associated with a radiation level for each region. A software bot "LINE shopping friend" may recommend an item that the user desires to shop, or may provide price comparison information, and the like.

A software bot "LINE traffic information" may provide the user with real-time is traffic information of each region in a one-to-one chatting form. A software bot "LINE travel agency" may provide travel region information, and make a reservation of transportation, an accommodation, and the like.

In addition to "LINE Japanese interpretation", a software bot for interpreting other languages, for example, "LINE Chinese interpretation" and the like may be provided.

Various software bots may not be understood to limit the scope of the present invention and may be understood to describe a portion of various embodiments of the present invention.

For example, the software bots are not limited to information providing software bots and thus, software bots having various extended functions for games, entertainment, and the like may be provided.

The user interface for introducing the above software bots so that the user may selectively add the software bots as friends may be provided in a form of a friend recommendation page as shown in FIG. 18, and may also be provided in form of a separate store/market page.

Such store/market pages may be provided so that developers may upload interesting software bots developed by the developers. In the store/market pages, the software bots may be provided free of charge or as paid items.

Figure 19:
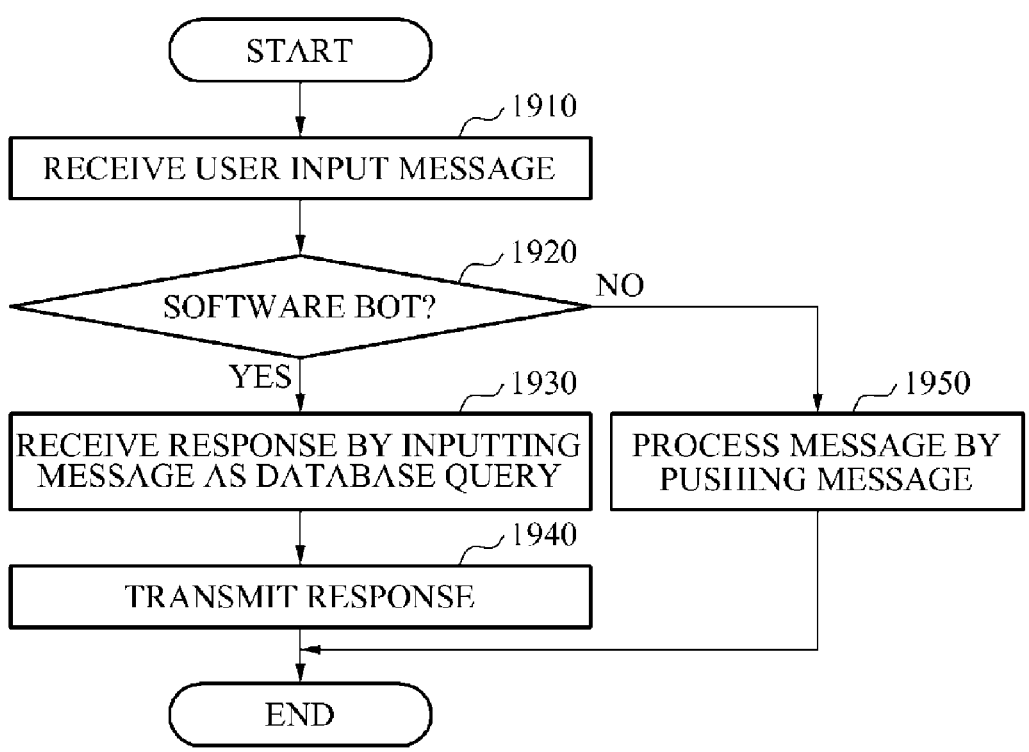
FIG. 19 is a flowchart illustrating an information providing method according to exemplary embodiments of the present invention.

FIG. 19 is a flowchart illustrating an information providing method according to exemplary embodiments of the present invention.

In operation 1910, a message input by a user through a conversation session of an instant messaging application may be input to the information providing system 110.

In operation 1920, the information providing system 110 may determine whether is the received message relates to an actual user or a software bot, for example, a LINE bot.

In operation 1950, when the received message relates to the general user, the information providing system 110 may process the received message by pushing the received message to a counter party as in a conventional instant messaging service. On the contrary, when the received message relates to the software bot, the information providing system 110 may retrieve a response by inputting the received message as a database query in operation 1930. In operation 1940, the information providing system 110 may transmit the response to a user terminal.

Even though operations shown in the flowchart of FIG. 19 are briefly described, the information providing method may be extended and modified depending upon various embodiments with reference to FIG. 1 through FIG. 18, and may be included within the spirit of the present invention without departing from the scope of the present invention.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, it is possible to enhance user convenience and interest by providing information in an interactive form using a response to a user input message.

According to exemplary embodiments of the present invention, the system and method of the present invention is applicable to various types of communicable terminals such as a smart phone, a table PC, and the like, and to employ various functions of a terminal such as position information, a push alarm, and the like. Therefore, various applications or extensions may be possible.

According to exemplary embodiments of the present invention, it is possible to add various software bots as conversation friends in a messaging application. A user may selectively add a software bot as a friend of the user and converse with the added software bot.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor to provide information through an instant messaging application, the method comprising:
   receiving a request from a terminal through the instant messaging application for adding a software bot as a friend;
   registering, using the processor, the software bot as the friend of a user of the terminal;
   transmitting a guidance about how to use the software bot to the terminal as a message by the software bot;
   transmitting an input request message to the terminal as a message by the software bot the input request message including a message asking the user to input position identification and a message asking the user to input an alarm time at which a response to the reply message is to be transmitted to the terminal each day;
   receiving a reply message by the user from the terminal in response to the input request message, the reply message including position identification and an alarm time at which a response to the reply message is to be transmitted to the terminal each day;
   storing the reply message as terminal information associated with the terminal;
   retrieving a response to the reply message as a query from a database; and
   transmitting the response to the terminal as a message by the software bot,
   wherein the instant messaging application is configured to display all the messages between the software bot and the user as a thread, and
   wherein the transmitting the response to the terminal comprises periodically transmitting the response associated with a region corresponding to the position identification at the alarm time, included in the reply message, each day through the messaging application based on the database information.

2. The method of claim 1, wherein the receiving the reply message comprises receiving the reply message input by the terminal within a conversation session between the terminal and the software bot provided by the messaging application.

3. The method of claim 1, wherein the transmitting the response to the terminal comprises transmitting the response to the terminal over a network such that the response is displayed within a conversation session between the terminal and the software bot provided by the messaging application.

4. The method of claim 1, wherein the transmitting the response to the terminal comprises transmitting the response to the terminal over a network such that the response is displayed through a push alarm of the terminal.

5. The method of claim 1,
wherein the software bot is one of a plurality of software bots capable of registering to the messaging application and
wherein the response is different based on a type of the software bot even when the received reply message is the same.

6. The method of claim 1, wherein the software bot provides weather information.

7. The method of claim 6, wherein when the received reply message comprises at least one of position identification information and time identification information, the response to the reply message comprises weather information concerning the information included in the reply message.

8. The method of claim 6, wherein when the received reply message comprises position identification information, the response to the reply message comprises weather information associated with the day and the following day of a region corresponding to the position identification information.

9. The method of claim 6, wherein when the received reply message comprises time identification information, the response to the reply message comprises basic local weather information of time concerning the time identification information.

10. The method of claim 1, wherein in response to a determination that the received reply message is incapable of retrieving the response by inputting the reply message as the query, the response comprises a request to input a new reply message.

11. A method that uses a processor to provide information through a messaging application, the method comprising:
recommending a software bot to a terminal for registering the software bot as a friend of a user of the terminal;
receiving a request from the terminal through the messaging application for adding the software bot as a friend of the user;
registering, using the processor, the software bot as the friend of the user of the terminal;
initiating a conversation session with the software bot;
transmitting a guidance about how to use the software bot to the terminal as a message by the software bot;
transmitting an input request message to the terminal as a message by the software bot, the input request message including a message asking the user to input position identification and a message asking the user to input an alarm time at which a response to the reply message is to be transmitted to the terminal each day;
receiving a reply message by the user from the terminal within the conversation session in response to the input request message, the reply message including position identification and an alarm time at which a response to the reply message is to be transmitted to the terminal each day;
storing the reply message as terminal information associated with the terminal;
retrieving a response to the reply message as a query from a database by inputting the reply message as the query; and
transmitting the response to the terminal as a message by the software bot,
wherein the messaging application is configured to display all the messages between the software bot and the user as a thread, and
wherein the transmitting the response to the terminal comprises periodically transmitting the response associated with a region corresponding to the position identification at the alarm time, included in the reply message, each day through the messaging application based on the database information.

12. A system to provide information through a messaging application, the system comprising:
a processor configured to
receive a request from a terminal through the instant messaging application for adding a software bot as a friend,
register the software bot as the friend of a user of the terminal,
control to transmit a guidance about how to use the software bot to the terminal as a message by the software bot;
control to transmit an input request message to the terminal as a message by the software bot, the input request message including a message asking the user to input position identification and a message asking the user to input an alarm time at which a response to the reply message is to be transmitted to the terminal each day,
receive a reply message by the user from the terminal in response to the input request message, the reply message including position identification and an alarm time at which a response to the reply message is to be transmitted to the terminal each day,
store the reply message as terminal information associated with the terminal,
retrieve a response to the reply message as a query from a database by inputting the reply message as the query, and
control to transmit the response to the terminal as a message by the software bot,
wherein the messaging application is configured to display all the messages between the software bot and the user as a thread, and
wherein the processor is configured to periodically transmit the response associated with a region corresponding to the position identification at the alarm time, included in the reply message, each day through the messaging application based on the database information.

13. The system of claim 12, wherein the processor is configured to display the response within the conversation session between the terminal and the software bot provided by the messaging application of the terminal.

14. The system of claim 12, wherein the processor is configured to display the response on the terminal through a push alarm of the terminal.

15. The system of claim 12, wherein the software bot is one of a plurality of types of software bots and the processor is configured to retrieve a different response to the same reply message based on the type of the software bot and is configured to register each type of software bot associated with a terminal.

16. The system of claim 15, further comprising:
a terminal information storage unit configured to store and manage information associated with each registered software bot.

17. A non-transitory computer-readable recording medium having recorded thereon a program that causes a computer to execute a method of providing information through a messaging application, the method comprising:
receiving, from a terminal, a request for adding a software bot as a friend;
registering the software bot as the friend of a user of the terminal;
transmitting a brief address and a simple guidance about how to use the software bot to the terminal as a message by the software bot;
transmitting, by the software bot, an input request message to the terminal, the input request message including a message asking the user to input position identification and a message asking the user to input an alarm time at which a response to the reply message is to be transmitted to the terminal each day;
receiving a reply message by the user from the terminal in response to the input request message, the reply message including position identification and an alarm time at which a response to the reply message is to be transmitted to the terminal each day;
storing the reply message as terminal information;
retrieving a response to the reply message as a query from a database by inputting the reply message as the query; and
transmitting the response to the terminal as a message by the software bot,
wherein the messaging application is configured to display all the messages between the software bot and the user as a thread, and
wherein the transmitting the response to the terminal comprises periodically transmitting the response associated with a region corresponding to the position identification at the alarm time, included in the reply message, each day through the messaging application based on the database information.

18. A non-transitory computer-readable recording medium having recorded thereon a program that causes a computer to execute a method of providing information through a messaging application, the method comprising:
recommending a software bot to a terminal for registering the software bot as a friend of a user of the terminal;
receiving a request from the terminal for adding the software bot as a friend of the user;
registering the software bot as the friend of the user of the terminal;
initiating a conversation session with the software bot;
transmitting a brief address and a simple guidance about how to use the software bot to the terminal as a message by the software bot;
transmitting an input request message to the terminal within the conversation session as a message by the software bot, the input request message including a message asking the user to input position identification and a message asking the user to input an alarm time at which a response to the reply message is to be transmitted to the terminal each day;
receiving a reply message input by the user from the terminal within the conversation session in response to the input request message, the reply message including position identification and an alarm time at which a response to the reply message is to be transmitted to the terminal each day;
storing the reply message as terminal information associated with the terminal;
retrieving a response to the reply message as a query from a database by inputting the reply message as the query; and
transmitting the response to the terminal as a message by the software bot,
wherein the messaging application is configured to display all the messages between the software bot and the user as a thread, and
wherein the transmitting the response to the terminal comprises periodically transmitting the response associated with a region corresponding to the position identification at the alarm time, included in the reply message, each day through the messaging application based on the database information.

19. The method of claim 1, wherein the instant messaging application is configured to display a conversation screen of a one-to-one chatting scheme on the terminal in which messages by the software bot as the friend of the user are displayed at one side of the conversation screen and messages by the user are displayed at another side of the conversation screen along with time so that the input request message is displayed at the one side of the conversation screen, the reply message is displayed at the another side of the conversation screen and the response to the reply message is displayed at the one side of the conversation screen, in this order.

20. The method of claim 11, wherein the messaging application is configured to display a conversation screen of a one-to-one chatting scheme on the terminal in which messages by the software bot as the friend of the user are displayed at one side of the conversation screen and messages by the user are displayed at another side of the conversation screen along with time so that the input request message is displayed at the one side of the conversation screen, the reply message is displayed at the another side of the conversation screen and the response to the reply message is displayed at the one side of the conversation screen, in this order.

21. The system of claim 12, wherein the messaging application is configured to display a conversation screen of a one-to-one chatting scheme on the terminal in which messages by the software bot as the friend of the user are displayed at one side of the conversation screen and messages by the user are displayed at another side of the conversation screen along with time so that the input request message is displayed at the one side of the conversation screen, the reply message is displayed at the another side of the conversation screen and the response to the reply message is displayed at the one side of the conversation screen, in this order.

22. The non-transitory computer-readable recording medium of claim 17, wherein the messaging application is configured to display a conversation screen of a one-to-one chatting scheme on the terminal in which messages by the software bot as the friend of the user are displayed at one side of the conversation screen and messages by the user are displayed at another side of the conversation screen along with time so that the input request message is displayed at the one side of the conversation screen, the reply message is displayed at the another side of the conversation screen and the response to the reply message is displayed at the one side of the conversation screen, in this order.

23. The non-transitory computer-readable recording medium of claim 18, wherein the messaging application is configured to display a conversation screen of a one-to-one chatting scheme on the terminal in which messages by the software bot as the friend of the user are displayed at one side of the conversation screen and messages by the user are displayed at another side of the conversation screen along with time so that the input request message is displayed at the one side of the conversation screen, the reply message is displayed at the another side of the conversation screen and the response to the reply message is displayed at the one side of the conversation screen, in this order.

24. The method of claim 11,
wherein the position identification included in the reply message is generated from the selection by the user of a point/region on a map screen of the user terminal.

25. The system of claim 12,
wherein the position identification included in the reply message is generated from the selection by the user of a point/region on a map screen of the user terminal.

* * * * *